March 21, 1950 W. R. RYAN ET AL 2,501,236
DEPTH SOUNDING RECORDER
Filed Feb. 26, 1945 4 Sheets-Sheet 2

INVENTORS
William R. Ryan
Sol Levine
BY
Roy D. Bateman
ATTORNEY

March 21, 1950  W. R. RYAN ET AL  2,501,236
DEPTH SOUNDING RECORDER
Filed Feb. 26, 1945  4 Sheets-Sheet 3
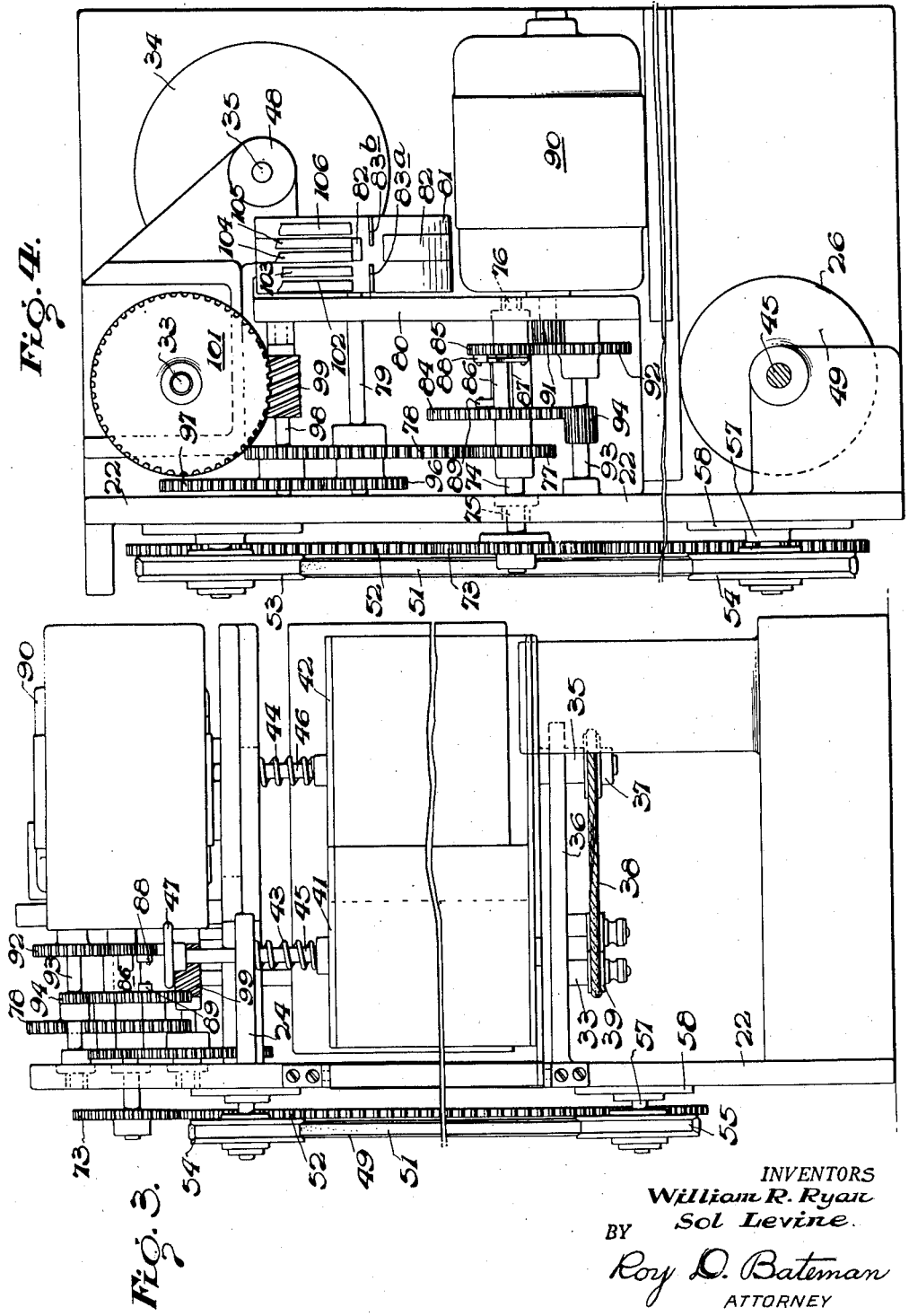
INVENTORS
William R. Ryan
Sol Levine.
BY
Roy D. Bateman
ATTORNEY March 21, 1950 W. R. RYAN ET AL 2,501,236
DEPTH SOUNDING RECORDER
Filed Feb. 26, 1945 4 Sheets-Sheet 4
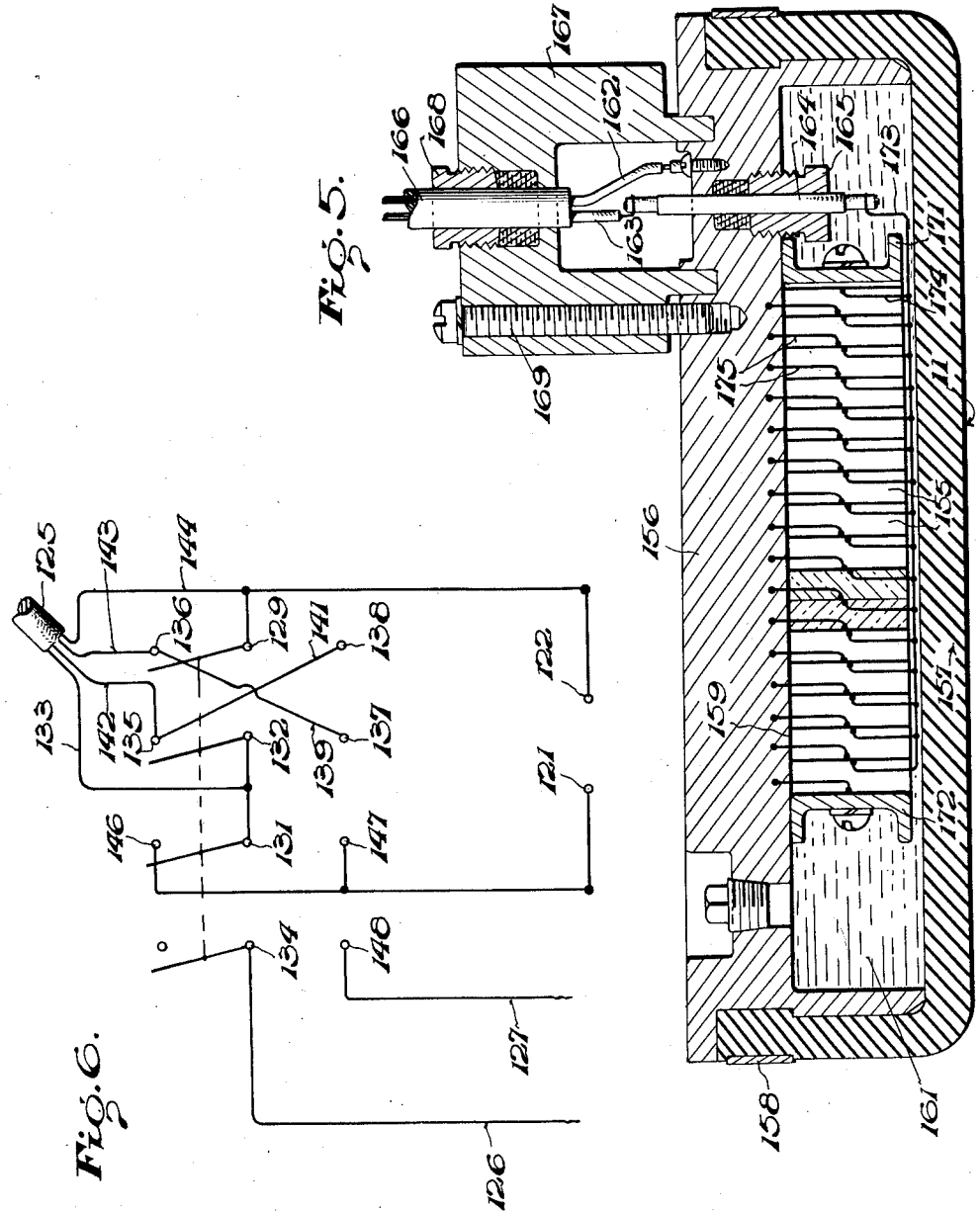
INVENTORS
William R. Ryan
Sol Levine
BY
Roy D. Bateman
ATTORNEY Patented Mar. 21, 1950

2,501,236

UNITED STATES PATENT OFFICE 2,501,236

DEPTH SOUNDING RECORDER

William R. Ryan, Darien, Conn., and Sol Levine, Brooklyn, N. Y., assignors to Bendix Aviation Corporation, Brooklyn, N. Y., a corporation of Delaware Application February 26, 1945, Serial No. 579,872

5 Claims. (Cl. 346—139)

The present invention relates to depth sounding apparatus and more particularly to apparatus for producing a record of nautical depth, in which a sonic or supersonic impulse is sent out, and upon receipt of the echo from the ocean bottom a mark is placed upon the chart, the distance of the mark from the "zero" edge of the chart being a measure of the depth.

While apparatus of this general character have been heretofore proposed, they have not proved altogether satisfactory because they are of complicated costly construction and moreover embody rotating stylus-carrying arms which have made it necessary to provide a large and bulky housing for enclosing the working parts of such prior apparatus. Moreover, in the rotating arm type of apparatus heretofore used, it is difficult to read the chart while the device is in operation because the rotating arm or arms are continuously sweeping past the observer's eyes.

We have discovered that driving a ring structure in synchronism with the cyclical switching mechanism and providing the ring with at least one stylus adapted to sweep over a chart upon which it is desired to record the depth, a depth sounding recorder of extremely simple and efficient construction is achieved and in which a mark is produced upon the chart at a distance from one edge which is a measure of the depth, the ring constituting a window through which the indication on the chart may be readily observed at all times, there being no stylus arm or other rotating obstruction to impair visibility.

It is accordingly the major object of this invention to provide a novel depth sounding apparatus of extremely simple yet rugged and efficient design, and one in which a trace is produced upon a horizontally moving chart, a large portion of the trace being visible at all times through a comparatively large window, and there being no rotating arm sweeping over the chart.

A further important object is to provide a depth sounding recorder embodying a speed change mechanism whereby the speed of the stylus and the chart may be varied to provide two or more depth sounding ranges, the cyclic impulse sending mechanism and the stylus drive being so drivingly connected that a change in the speed of one will effect a corresponding change in the speed of the other, thereby maintaining the proper relationship between the two at all times.

Another object is to provide a depth sounder of the multi-range type, with a speed change mechanism of novel form in which it is merely necessary to reverse the direction of rotation of the driving motor to effect the speed change, the direction of rotation remaining unchanged.

Further objects will become apparent as the specification proceeds in conjunction with the annexed drawings, and from the appended claims.

In the drawings—

Fig. 3 is a side elevational view of the apparatus shown in Fig. 1.

Fig. 4 is a top plan view of the apparatus shown in Figs. 2 and 3.

Fig. 5 is a vertical sectional view through a form of transceiver which has proved very satisfactory in the depth sounder of the invention, and Fig. 6 is a schematic view of the switch mechanism employed to change from one range to another.

Figure 1:
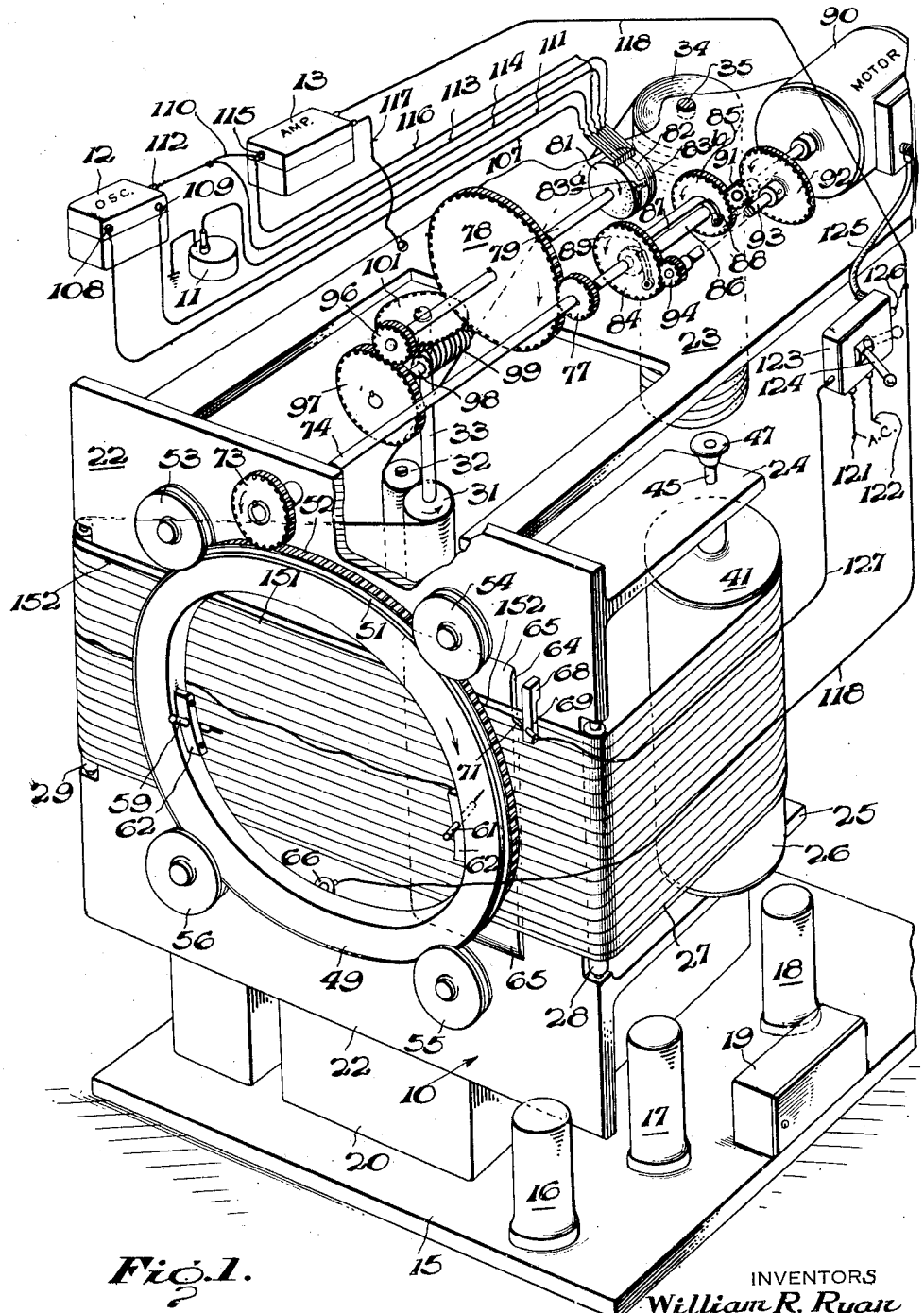
Fig. 1 is a diagrammatic perspective view illustrating the depth sounding apparatus of the invention.
Figure 2:
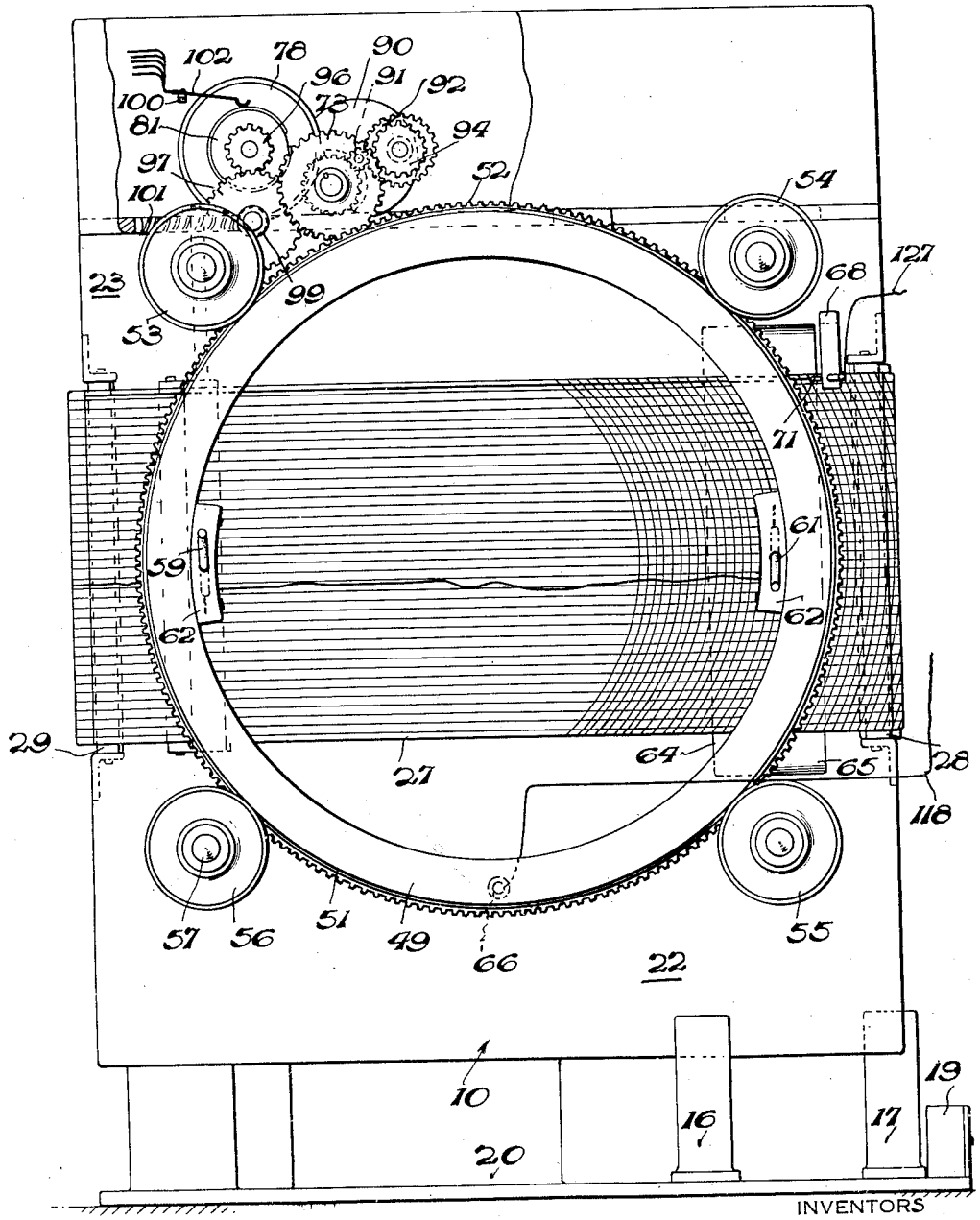
Fig. 2 is a front view of the actual apparatus.

With continued reference to the drawings, in which like reference characters have been employed to designate similar parts throughout the several views, and referring first to Fig. 1, the apparatus is made up of a novel recorder designated as 10, an oscillator, an amplifier, and a piezo-electric crystal unit 11. The latter may be of any well-known character, and is termed a "transceiver," inasmuch as it functions as both a transmitter and a receiver. We have found that very good results are secured with a piezo-electric crystal unit embodying a piezo-electric crystal assembly located in a castor oil-filled chamber having a wall capable of transmitting compressional waves, so that vibrations of the crystal are readily transmitted through the oil and flexible wall to the medium whose depth is being measured. For shipboard use the transmitter is usually located near the keel of the ship in a well or the like, in direct contact with the water and facing downwardly so as to direct compressional waves toward the ocean floor. It may however, be equipped with a steel or other covering to protect it against rupture in the event of grounding.

The apparatus also includes an oscillator 12, which also may be of any well-known construction. In the present instance we have found that a standard oscillator producing supersonic vibrations in the neighborhood of 50,000 cycles per second gives very satisfactory results. An electronic amplifier 13, also of standard well-known construction, is adapted to receive the echo impulse and amplify it sufficiently to cause the stylus to produce a mark upon the chart. The novel manner in which these units are switched in cyclic manner will be described later.

The recorder is made up of a base 15 upon which various elements 16, 17, 18, and 19 and 20 of the electronic amplifier may be supported in well-known manner. Supported upon the base is a front plate 22 carrying a rearwardly extending top plate 23 and a pair of rearwardly directed side arms 24 and 25.

The latter support a chart supply roll 26 from which the chart paper 27 is fed over an idler roller 28 located at one edge of the plate. The paper passes over the front face of the plate in substantial parallelism therewith and passes over a second idler roller 29 and thence to a pair of paper feed rollers 31 and 32, which may be yieldingly urged together in well-known manner to establish a frictional drive for the paper.

Main feed roller 31 is carried by a shaft 33, which is driven in the manner to be hereinafter pointed out. The paper passes from feed roll 32 to a take up roll 34 which, as shown in Fig. 3, is mounted on a shaft 35 which extends below its supporting plate 36 and carries a pulley 37 at its lower end. A spring type belt 38 passes over pulley 37 and over a pulley 39 mounted on the lower end of feed roll shaft 33, and is crossed so that shaft 35 is constantly subjected to a torque tending to wind up the paper on the take up roll.

In order that the supply and take up rolls may be readily removed, for the purpose of installing a new roll in the machine, they are provided at the top with vertically shiftable flanged cap members 41 and 42 respectively, which are urged downwardly into gripping engagement with the rolls by means of compression springs 43 and 44. The caps may be lifted upwardly against the action of their springs by shafts 45 and 46, having operating knobs 47 and 48 at their upper ends. The lower ends of the rolls are accurately located so that the chart will take the proper path, or will "track" accurately across the face of plate 22, and insure accurate cooperation between the chart and stylus.

The novel stylus carrying ring 49 is located in front of plate 22 in spaced parallel relationship therewith and is preferably constructed of metal or other distortion resistant material so that it will accurately retain its shape throughout the life of the apparatus.

As seen more particularly in Figs. 3 and 4, the ring is of generally rectangular form in cross section and is provided with an accurately formed track or raceway 51 adjacent its front edge and an integral spur gear 52 adjacent its rear edge.

The ring is journalled for free rotation about a fixed horizontal axis by means of four rollers 53, 54, 55, and 56, which are preferably made of insulating, non-metallic material, for the purpose of insulating the ring from the frame structure and also promoting quietness of operation. The rolls may be journalled in any suitable manner, but are preferably carried by anti-friction bearings supported by stub shafts 57 having flanged mounts 58 securing them to the front of plate 22.

The ring is provided with a plurality, preferably two styli 59 and 61, which are secured to the ring in any suitable manner, as for instance by means of block-like holders 62. The styli are preferably inclined as shown, so that when the ring is rotated in the direction indicated by the arrow, they will smoothly glide over the surface of the paper. The styli are made of steel or other electrically conductive material, and the paper is so chemically treated, that upon impressing a potential upon the styli and the underlying shoe, a legible mark will be produced upon the paper, in a manner well understood in the art.

In order to cause the styli to each produce a mark upon the chart only during their down-travel, an electrically conductive shoe or plate 64, having rounded ends 65, is secured to the face of plate 22. The shoe lifts the paper away from plate 22 sufficiently to bring it into range of the styli during their down-travel. The curved ends 65 of the shoe ensure that the styli will smoothly glide over the edges of the paper during operation, with no tendency to tear the edge thereof. From the foregoing it is clear that the chart is disposed at a slight angle with respect to the plane of plate 22, and that when it reaches the upwardly travelling styli, it will be spaced sufficiently from them as to prevent them from producing a second trace upon the paper.

Electricity is conducted to the ring by means of a spring-pressed plunger type brush 66, guided for sliding movement in plate 22 and bearing against the inner face of the ring.

It is also desirable during certain operating conditions to produce a second rectilinear, or straight-line trace upon the paper adjacent the zero mark. To this end an insulating bracket 68 carried by plate 22 has an arm 69 overlying the paper and carrying a stylus 71 which, when energized, cooperates with shoe 65 to produce a straight line upon the chart adjacent its upper edge. This line is employed to denote in which of the two ranges the device is operating, in the manner to be hereinafter set forth.

The ring may be rotated at synchronous speed with respect to the cyclic switch mechanism, in any suitable manner. However, we prefer to drive it by means of the following novel drive mechanism, which has proved very successful in practice. A spur gear 73, rigidly carried by shaft 74 which is suitably journalled in bearings 75 and 76 located in front plate 22 and a rear plate 80, meshes with spur gear 52. Shaft 74 rigidly carries a spur pinion 77 which meshes with a spur gear 78 rigidly mounted on a shaft 79, which is journalled in front and rear plates 22 and 80. Shaft 79 extends through plate 80 and rigidly carries a commutator 81 on the free end thereof. The latter is provided with a comparatively wide conducting strip 82 which extends substantially 360° around the commutator so that its ends define a comparatively small gap. Aligned with the gap in strip 82 are a pair of comparatively narrow conductive members 83a and 83b, it being observed that strip 83b extends partially into the gap, whereas member 83a terminates at the edge of the gap. The commutator will be more fully described hereinafter.

The foregoing gear assemblies are so designed that commutator 81 will make two revolutions for each revolution of ring 49, in view of the fact that the latter carries two styli. It should be understood that in the event that only one stylus is used, the gearing should be modified so that the commutator will make one revolution for each revolution of ring 49.

In the event that the styli produce the reference or zero marks upon the chart so as to define a zero line which does not accurately coincide with the zero line on the chart, the apparatus may be calibrated by angularly adjusting the entire brush assembly bodily about the axis of the commutator in a manner well understood in the art, to "advance" or "retard" the time of sending the impulse with respect to the angular positions of the styli, or if desired the latter may be angularly adjusted with respect to the ring to accurately locate the zero line.

In order to render the apparatus more flexible, and adapt it for recording in deep and shallow waters, we have provided means whereby both the commutator and ring may be rotated at two different speeds. For convenience, we have selected a ratio between the two speeds of 6 to 1, so that feet may be recorded in one range and fathoms in the other. While various types of speed changing mechanisms may be employed, we preferably utilize the novel speed changing mechanism which will now be described, inasmuch as it makes it possible to change from one speed to the other by merely reversing the direction of the driving motor, and at the same time retain the given direction of rotation of the ring.

Freely rotatable upon shaft 74 are a pair of spur gears 84 and 85. Rigidly secured to the shaft, between gears 84 and 85 is a sleeve-like ratchet member 86 having a single ratchet face 87. Coacting with the ratchet face 87 is a pawl 88 carried by gear 85 and is spring urged into engagement with the ratchet, and a second pawl 89 carried by gear 84 and similarly spring-urged into cooperation with the ratchet. Meshing with gear 85 is a pinion 91 carried by the shaft of a reversible motor 90, the latter being suitably mounted upon plate 23. Pinion 91 also meshes with a gear 92 which is rigidly mounted on a shaft 93. The latter is freely journalled in plates 22 and 80 and carries a spur pinion 94 meshing with spur gear 84.

From the foregoing disclosure it is apparent that both trains of gears are constantly in mesh. It is nevertheless possible to achieve two different speed ratios and maintain uni-directional rotation of output shaft 74 by merely reversing the direction of rotation of motor 90. Assuming first that the device is operating in its high or "feet" ratio (six times faster than its low ratio), and with motor 92 driving pinion 91 clockwise, spur pinion 85 will be driven counter-clockwise, causing pawl 88 to engage face 87 of ratchet 86 and drive shaft 74 also in counter-clockwise direction. This results in driving ring 49 clockwise, as indicated.

Assuming now that the direction of motor 90 is reversed, so as to drive pinion 91 counter-clockwise, this results in rotating spur gear 85 clockwise, and the latter is accordingly incapable of driving ratchet 86, inasmuch as pawl 88 merely idly rides over ratchet face 87. Counter-clockwise rotation of pinion 91, as just described, rotates gear 92 and shaft 93 clockwise, which results in pinion 94 driving gear 84 counter-clockwise. Under these conditions pawl 89 engages ratchet face 87 and drives shaft 74 in the same direction as before, but at a lower speed, due to the double reduction effected by pinions 91 and 94 and gears 92 and 84.

Shaft 79 also carries a pinion 96, which meshes with a spur gear 97 carried by shaft 98 journalled in plates 22 and 80. Rigidly mounted on shaft 98 is a worm 99 which meshes with a worm gear 101 carried by paper feed drive-shaft 33. The paper drive rolls 31 and 32 are accordingly driven at a speed proportional to the speed of the stylus ring and commutator, in both speed ranges.

The manner in which the oscillator and amplifier are alternately connected to the transceiver will now be described. Referring more particularly to Figs. 1 and 4, a plurality of brushes 102, 103, 104, 105, and 106 are insulatingly supported in any suitable well-known manner, as for instance by means of a support 100, and frictionally bear upon commutator 81. As seen in Fig. 1, brush 102 is connected by a lead 107 to terminal 108 of oscillator 12, and terminal 109 of the latter is connected to brush 103 by a lead 111. Output terminal 112 of the oscillator is connected to brush 106 by a lead 113. The oscillator is of well known construction and is "keyed" whenever terminals 108 and 109 are connected to each other. Transceiver 11 is connected to brush 105 by a lead 114.

Terminal 115 of amplifier 13 is connected to brush 104 by a lead 116 and also to lead 113 by a short lead 110. One of the output terminals of the amplifier is connected to the frame of the apparatus or grounded by means of a lead 117, and the other output terminal is connected by means of a lead 118 to brush 66.

Motor 90 is energized by A. C. mains 121 and 122, which lead to a switch 123 having an operating handle 124. The switch is connected to the motor by a cable 125. The switch is also connected to amplifier lead 118 by means of a lead 126, and to stationary stylus 71 by means of a lead 127.

Referring more particularly to Fig. 6, it is observed that a four-pole double throw switch is utilized to control the motor, and in which one side 122 of the line is connected to center terminal 129, while center terminals 131 and 132 are connected by a lead 133 to motor cable 125. The fourth center terminal 134 is connected to amplifier lead 126. Outer terminals 135, 136, 137, and 138 are interconnected by crossed leads 139 and 141, so as to form a reversing connection. Terminals 135 and 136 are connected to the motor cable by leads 142 and 143 respectively. A lead 144 connects center terminal 129 to the motor cable. Outer terminals 146 and 147 are both connected to side 121 of the line, while terminal 148 is connected to lead 127 which goes to the stationary stylus.

From the foregoing disclosure it is apparent that with the switch thrown down, as shown in Fig. 1, the motor will run in one direction and stylus terminals 134 and 148 will be connected so as to energize the stationary stylus. When the switch is thrown up, it is apparent that the direction of rotation of the motor will be reversed and also terminals 134 and 148 will be disconnected, so as to deenergize the stationary stylus.

While any suitable speeds of rotation may be employed, we have found that when operating in the shallow or "feet" range, a speed of rotation of ring 49 of 144 R. P. M. gives very satisfactory results. This yields a speed of 24 R. P. M. in the fathom range.

Assuming that the switch is thrown down, so as to cause the motor to rotate the parts at their low or fathom speed range, it is apparent that when commutator strips 83a and 83b pass under the brush assembly, brushes 102 and 103, will be contacted by strip 83a and that brushes 105 and 106 will be contacted by strip 83b. This results in the oscillator being "keyed," because segment 83a and brushes 102 and 103 connect terminals 108 and 109. The resulting impulse is transmitted to the amplifier by lead 110 and also to the transceiver 11 by way of lead 113, brushes 105 and 106, segment 83b and lead 114. A supersonic impulse or compressional wave is accordingly sent out and the amplifier is simultaneously momentarily energized so as to cause one of the styli to place a mark upon the chart. These marks, two of which are produced for each revolution of the ring, establish a "zero" line 151 upon the chart located closely adjacent the line 152, which is drawn upon the chart by the stationary stylus, and which will be hereafter referred to as the "range" line. While we prefer to energize the amplifier upon sending out the impulse, it is to be understood that this is done for purposes of calibration and that if desired, a switch may be inserted in line 110, so as to make it possible to cut out the zero line at will.

As indicated in Fig. 4, strips 83a and 83b are comparatively narrow, so that the operation just described takes place in a very short period of time, and thereafter, wide commutator strip 82 engages brushes 104 and 105, thereby connecting transceiver 11 to input terminal 115 of the amplifier, so that upon receipt of the echo of the impulse or compressional wave from the ocean bottom, the electrical impulse generated in the transceiver by the supersonic echo will be amplified and transmitted over lead 118 to the rotating ring. Upon receipt of the echo, ring 49 is accordingly energized by the amplifier. This impresses a potential upon, and causes stylus 59 (or 61, whichever is involved), to place a mark upon the chart a distance from the zero line 151 which is proportional to the depth being measured. In the present instance the trace will indicate fathoms. It should be observed that each time an impulse is transmitted from the amplifier to lead 118, a mark is also placed upon the chart by stylus 71, the purpose of the line defined by these marks being to denote which range of the apparatus is being utilized. When it is desired to operate in the other (feet) range, switch 124 is thrown up, so as to reverse motor 92 and open the stationary stylus circuit. The operation is the same as that just described, except that the ring travels six times faster than its previous speed and records in feet rather than in fathoms. Also, due to the fact that line 127 is open, range line 152 is omitted from the chart which indicates to the operator that the "feet" range is in operation, making it unnecessary for him to coordinate his observations with the position of switch 124.

From the foregoing detailed disclosure, it is apparent that the invention provides a simple, low-cost, dual-range depth recorder of improved, efficient construction, and one in which there are no rotating arms or other devices sweeping over the paper which would interfere with proper reading of the chart.

While any suitable form of piezo-electric crystal assembly may be employed, we prefer to use a unit of the type shown in Fig. 5. With continued reference to this figure, a plurality of piezo-electric crystals 155, such as Rochelle salt or the like, are disposed in closely adjacent relationship within a casing 156, but are insulated from each other. The casing has its open side closed by a special sound transmitting rubber-like cap 157 which is secured to the body by a metal band 158. The Rochelle salt crystals are so placed in the casing as to present their major axes or most active piezo-electric vibrational axes vertically, so that when an electrical potential is impressed upon them they will react against flat surface 159 of the casing and impart compressional vibrations to a body of castor oil or any other suitable liquid 161, and thence through rubber cap 157 to the water. Electrical connections to the crystal assembly are made by means of a ground lead 162 connected to casing 156 and a lead 163 connected to an electrode 164 which passes into the casing through a sealing gland assembly 165. The cable unit 166 is sealingly connected to the structure 167 by means of a sealing cap 168, the cap being secured to the casing by a plurality of cap screws 169. The crystals are held in proper stacked relationship by means of channel members 171 and 172 and electrical connection to them is effected so as to place the crystals in parallel, the connections being made to the side faces of the crystals. We have diagrammatically shown the connections as comprising a lead 173 and branch leads 174 connected to the electrode. The other faces of the crystals have been diagrammatically illustrated as grounded to the casing by branch leads 175.

While we prefer to use the foregoing piezo-electric crystal unit, because it has given very satisfactory service in actual practice, it is to be understood that the invention is not limited thereto, and that other suitable devices may be employed to transmit compressional waves to the water, and to receive the ensuing echo.

Also, the novel recording apparatus of the invention may be combined in any desired manner with a device or devices for giving instantaneous depth indications and it is therefore to be understood that it is not limited to depth sounding recorders.

From the foregoing detailed disclosure, it is apparent that the invention provides a depth sounding apparatus of extremely simple but yet efficient construction, which places a record of the depth upon a horizontally moving chart by means of a novel ring and stylus assembly which affords a clear unobstructed view of the chart at all times; provides a zero indication which may be employed to calibrate the apparatus, and also provides for recording at two different speeds, a visual indication on the chart showing at a glance in which range the apparatus is operating.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. In a recording apparatus: means for supporting a chart with a portion thereof in a predetermined planar area and moving it across said area; an annular stylus-supporting carriage having an axis of radial symmetry substantially perpendicular to said area, said carriage overlying said area in spaced parallel relation thereto and having an unobstructed central window through which a substantial portion of said planar chart portion is visible; means for supporting said annular carriage for rotation about said axis; means for rotating said carriage about said axis; a stylus mounted on said carriage for movement thereby over said chart; and means for causing said stylus to produce marks on said chart while traversing that portion of said chart that is moving into said window; whereby the leading end portion of a train of marks resulting from the combined movements of said stylus and chart is visible through said window.

2. Apparatus according to claim 1 in which said means for causing said stylus to produce marks on said chart comprises an electrically conductive backing plate dimensioned to support only that portion of the chart swept by the stylus that is moving into said window; and means for applying marking potentials across said plate and stylus.

3. Apparatus according to claim 1 in which said means supporting said carriage for rotation comprises a plurality of circumferentially distributed supporting elements movably engaging the annular carriage at circumferentially distributed points thereon.

4. Apparatus according to claim 3 in which said supporting elements comprise rollers in rolling engagement with said carriage.

5. In a multiple speed recording mechanism: a recording station; means for feeding a chart past said recording station; a stylus; a device for causing said stylus to sweep over said chart at said recording station; a two-speed mechanism and a reversible motor drivingly connected to said device; control means for reversing said motor at will; said two-speed mechanism embodying two speed-changing transmission trains each having a rotary input element coupled to said motor and a rotary output element coupled to said device, said two transmission trains having different speed ratios and opposite senses of rotation between their input and output elements, and each train including an overrunning clutch, said clutches being oppositely sensed with respect to the direction of rotation of said input shafts whereby said device is driven in a predetermined direction at one speed through one transmission train in response to rotation of said motor in one direction, and is driven in the same predetermined direction at a different speed through the other transmission train in response to rotation of said motor in the other direction.

WILLIAM R. RYAN.
SOL LEVINE.

REFERENCES CITED

The following references are of record in the file of this patent:

UNITED STATES PATENTS

| Number | Name | Date |
| --- | --- | --- |
| 1,427,181 | Westling | Aug. 29, 1922 |
| 1,613,520 | Marti | Jan. 4, 1927 |
| 1,667,540 | Dorsey | Apr. 24, 1928 |
| 2,075,285 | Hollingsworth | Mar. 30, 1937 |
| 2,108,089 | Turner, Jr. | Feb. 15, 1938 |
| 2,144,843 | Hearn | Jan. 24, 1939 |
| 2,147,668 | Pfeiffer | Feb. 21, 1939 |
| 2,198,171 | Mackenzie | Apr. 23, 1940 |
| 2,268,808 | Davis | Jan. 6, 1942 |
| 2,309,956 | Hughes | Feb. 2, 1943 |
| 2,350,994 | Anderson | June 13, 1944 |